United States Patent
Peyras-Carratte et al.

(10) Patent No.: US 8,828,162 B2
(45) Date of Patent: Sep. 9, 2014

(54) POROUS SUPPORTED ARTICLES AND METHODS OF MAKING

(75) Inventors: Jeremie Peyras-Carratte, Pont Sainte Maxence (FR); Jean-Marie Coant, Saint-Denis (FR); Lahoussaine Lalouch, Bornel Oise Picardie (FR)

(73) Assignee: 3M Innovative Properties Company, St. Paul, MN (US)

( * ) Notice: Subject to any disclaimer, the term of this patent is extended or adjusted under 35 U.S.C. 154(b) by 3 days.

(21) Appl. No.: 13/503,562
(22) PCT Filed: Oct. 19, 2010
(86) PCT No.: PCT/US2010/053155
§ 371 (c)(1),
(2), (4) Date: May 30, 2012
(87) PCT Pub. No.: WO2011/049927
PCT Pub. Date: Apr. 28, 2011

(65) Prior Publication Data
US 2012/0231692 A1    Sep. 13, 2012

Related U.S. Application Data

(60) Provisional application No. 61/253,582, filed on Oct. 21, 2009.

(51) Int. Cl.
*B32B 3/26* (2006.01)
*B32B 5/08* (2006.01)
(Continued)

(52) U.S. Cl.
CPC *D04H 1/72* (2013.01); *A47L 13/16* (2013.01); *B32B 2432/00* (2013.01); *D04H 1/541* (2013.01); *B32B 5/145* (2013.01); *B32B 2305/026* (2013.01); *D04H 1/732* (2013.01); *D04H 1/413* (2013.01); *D04H 3/14* (2013.01); *B32B 5/08* (2013.01); *B32B 3/26* (2013.01); *D04H 5/04* (2013.01); *D04H 5/06* (2013.01); *D04H 1/736* (2013.01); *D04H 5/08* (2013.01); *B32B 2262/12* (2013.01); *D04H 13/00* (2013.01)

USPC .......... 156/62.2; 264/121; 264/122; 264/126

(58) Field of Classification Search
CPC ............. B32B 3/26; B32B 5/08; B32B 5/10; B32B 5/14; B32B 5/145; B32B 5/26; B32B 7/04; B32B 2262/12; B32B 2305/026; B32B 2432/00; A47L 13/16; A47L 17/08; D04H 1/4374; D04H 1/541; D04H 1/559; D04H 1/732; D04H 1/736; D04H 5/06; D04H 5/08; D04H 13/00
USPC ......... 156/62.2; 264/112, 113, 121, 122, 125, 264/126
See application file for complete search history.

(56) References Cited

U.S. PATENT DOCUMENTS 2,958,593 A    11/1960    Hoover
(Continued)

FOREIGN PATENT DOCUMENTS

CN    1170445    1/1998
(Continued)

OTHER PUBLICATIONS

International Search Report, PCT/US2010/053155, mailed Jun. 29, 2011, 3 pages.
(Continued)

*Primary Examiner* — Michael Tolin
(74) *Attorney, Agent, or Firm* — Kennth B. Wood

(57) ABSTRACT

Porous supported articles and methods of making are disclosed. Multicomponent polymeric fibers are introduced into a forming chamber and are infilled at least into the interior void spaces of a support web. At least some of the infilled multicomponent component fibers are self-bonded to each other to form a porous web that is embedded within the support web. The porous embedded web may contain particles that are bonded to the multicomponent fibers of the web. The optional particles in the porous embedded web may be e.g. abrasive, absorbent, etc.

18 Claims, 4 Drawing Sheets

(51) Int. Cl.
  *A47L 13/16* (2006.01)
  *D04H 5/06* (2006.01)
  *D04H 5/08* (2012.01)
  *D04H 1/541* (2012.01)
  *B32B 5/14* (2006.01)
  *D04H 1/732* (2012.01)
  *D04H 1/413* (2012.01)
  *D04H 3/14* (2012.01)
  *D04H 5/04* (2006.01)
  *D04H 1/72* (2012.01)
  *D04H 1/736* (2012.01)
  *D04H 13/00* (2006.01)

(56) References Cited

U.S. PATENT DOCUMENTS

| | | | |
|---|---|---|---|
| 3,537,121 A | 11/1970 | McAvoy | |
| 3,837,988 A | 9/1974 | Hennen | |
| 3,910,284 A | 10/1975 | Orentreich | |
| 4,041,203 A | 8/1977 | Brock | |
| 4,212,692 A | 7/1980 | Rasen | |
| 4,227,350 A | 10/1980 | Fitzer | |
| 4,252,590 A | 2/1981 | Rasen | |
| 5,662,728 A * | 9/1997 | Groeger | 96/153 |
| 5,674,339 A * | 10/1997 | Groeger et al. | 156/145 |
| 5,685,757 A * | 11/1997 | Kirsch et al. | 442/344 |
| 5,685,935 A | 11/1997 | Heyer | |
| 5,786,059 A | 7/1998 | Frank | |
| 6,233,787 B1 | 5/2001 | Eriksen | |
| 6,272,707 B1 | 8/2001 | Robrecht | |
| 6,273,978 B1 | 8/2001 | Tai | |
| 6,375,886 B1 | 4/2002 | Angadjivand | |
| 6,525,240 B1 * | 2/2003 | Graef et al. | 604/383 |
| 2005/0081888 A1 * | 4/2005 | Pung et al. | 134/6 |
| 2005/0098910 A1 | 5/2005 | Andersen | |
| 2005/0129897 A1 * | 6/2005 | Zhou et al. | 442/381 |
| 2005/0159065 A1 | 7/2005 | Stralin | |
| 2005/0266230 A1 * | 12/2005 | Hill et al. | 428/317.9 |
| 2006/0085951 A1 | 4/2006 | Celli | |
| 2007/0010156 A1 | 1/2007 | Strandqvist | |
| 2007/0266503 A1 | 11/2007 | Schmidt-Forst | |
| 2008/0003906 A1 | 1/2008 | Hill | |
| 2008/0241301 A1 * | 10/2008 | Norgaard et al. | 425/145 |
| 2008/0318024 A1 | 12/2008 | Angadjivand | |

FOREIGN PATENT DOCUMENTS

| | | |
|---|---|---|
| EP | 1 950 333 | 7/2008 |
| JP | 2007-211386 | 8/2007 |
| WO | WO 98/45519 | 10/1998 |
| WO | WO 2005/044529 | 5/2005 |
| WO | WO 2007/147562 | 12/2007 |
| WO | WO 2008/051819 | 5/2008 |
| WO | WO 2008/066417 | 6/2008 |
| WO | WO 2008/145131 | 12/2008 |
| WO | WO 2009/087236 | 7/2009 |
| WO | WO 2009-088648 | 7/2009 |

OTHER PUBLICATIONS

Supplementary European Search Report, EP 10 82 5508, Dec. 2, 2013, 2 pages.

* cited by examiner

POROUS SUPPORTED ARTICLES AND METHODS OF MAKING

CROSS REFERENCE TO RELATED APPLICATIONS

This application is a national stage filing under 35 U.S.C. 371 of PCT/US2010/053155, filed Oct. 19, 2010, which claims priority to U.S. Provisional Application No. 61/253,582, filed Oct. 21, 2009, the disclosures of which are incorporated by reference in their entirety herein.

BACKGROUND

The present invention relates to porous articles and methods of making. Such articles are often used for scrubbing surfaces such as floors, countertops, shoe soles, and the like. Often, such porous articles are comprised of nonwoven webs. Such nonwoven webs may range in structure and properties, e.g. from dense to open, from hard to soft, from rigid to flexible, and so on.

SUMMARY

Porous supported articles and methods of making are disclosed. Multicomponent polymeric fibers are introduced into a forming chamber and are infilled at least into the interior void spaces of a support web. At least some of the infilled multicomponent fibers are self-bonded to each other to form a porous web that is embedded within the support web. The porous embedded web may contain particles that are bonded to the multicomponent fibers of the web. The optional particles in the porous embedded web may be e.g. abrasive, absorbent, etc.

Thus in one aspect, herein is disclosed a method of making a porous supported web, comprising: introducing discontinuous multicomponent polymeric fibers into a forming chamber; mixing the multicomponent fibers within the forming chamber; infilling the multicomponent fibers into at least some interior void spaces of a filamentary support web to form an infilled fibrous mat within at least some of the interior void spaces of the support web; and, exposing the multicomponent fibers to an elevated temperature to melt-bond at least some of the multicomponent fibers to each other so that the fibrous mat is self-bonded into a porous web that is embedded within at least some of the interior void spaces of the support web.

In another aspect, herein is disclosed a porous supported article, comprising: a filamentary support web comprising interior void spaces therein; an embedded porous web within at least some of the interior void spaces of the filamentary support web, the fibers of the web consisting essentially of discontinuous multicomponent polymeric fibers at least some of which are melt-bonded to each other at least at some points of fiber contact so as to comprise a self-bonded web.

These and other aspects of the invention will be apparent from the detailed description below. In no event, however, should the above summaries be construed as limitations on the claimed subject matter, which subject matter is defined solely by the attached claims, as may be amended during prosecution.

While the above-identified drawings and figures set forth embodiments of the invention, other embodiments are also contemplated, as noted in the discussion. In all cases, this disclosure presents the invention by way of representation and not limitation. It will be understood that numerous other modifications and embodiments can be devised by those skilled in the art, which fall within the scope and spirit of this invention.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
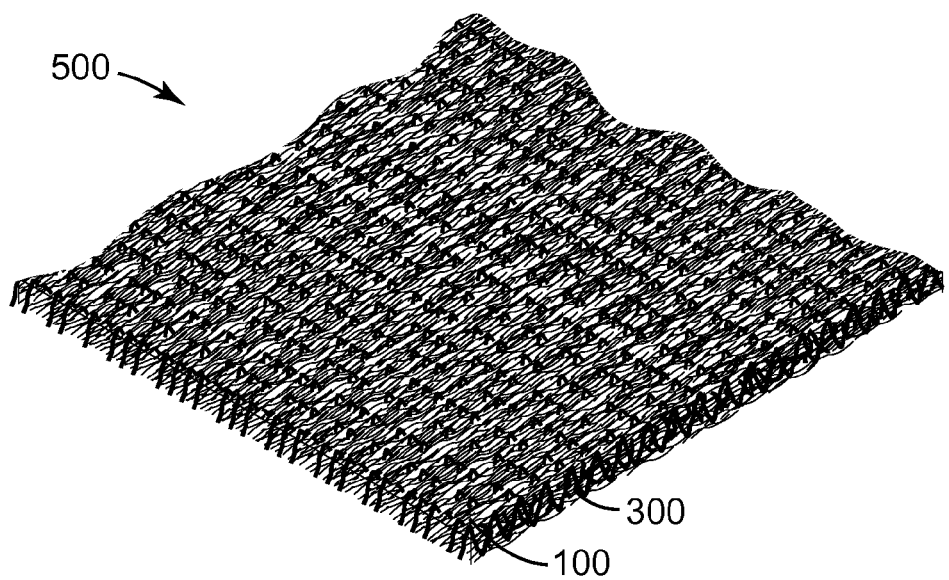
FIG. 1 is a perspective view of an exemplary porous supported article as disclosed herein.
Figure 2:
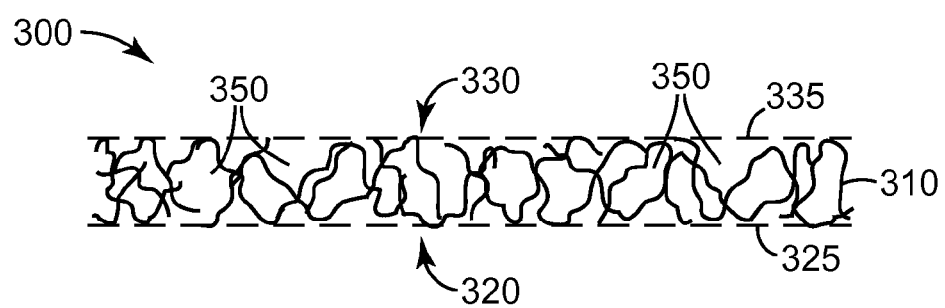
FIG. 2 is a cross sectional view of an exemplary support web as disclosed herein.

An exemplary porous supported article 500 is shown in FIG. 1. Article 500 is comprised at least of filamentary support web 300, and porous web 100 that is embedded within at least some of the interior void spaces of support web 300. With reference to FIG. 2, support web 300 may comprise any highly open, filamentary web comprising interior void spaces 350 within at least some of which porous web 100 may be embedded as described later herein. By filamentary is meant that support web 300 is comprised of polymeric filaments 310 that may have a diameter of at least about 100 microns, that are bonded (e.g., melt-bonded) at points of contact between different filaments or at points of self-contact of single filaments, so as to comprise a coherent web (i.e., a web that has sufficient mechanical integrity to be handled in the processes described herein).

Support web 300 comprises first major surface 335 on first major side 330 of support web 300. Those of ordinary skill in the art will appreciate that with the highly open structure of support web 300, first major surface 335 may not comprise a true surface (e.g., a continuous or even partially continuous surface) but rather may be represented as an imaginary plane defined by those portions of filaments 310 that protrude the fartherest outward on first major side 330 of support web 300 (as shown in FIG. 2). Similarly, second major surface 325 of support web 300 may not comprise a true surface but rather may be represented as an imaginary plane defined by those portions of filaments 310 that protrude the fartherest outward on second major side 320 of support web 300 (again as shown in FIG. 2). The thickness of support web 300 thus may be represented as the distance between first major surface 335 and second major surface 325 of support web 300. References herein to the interior of support web 300 thus refer to portions of support web 300 that are inward of (e.g., between) first major surface 335 and second major surface 325 of support web 300. In this context, interior void spaces 350 each comprise an open space (e.g., an empty space, or one filled with air, water, or some other fluid) within the interior of support web 300 that is at least partially defined by filaments 310. Generally, support web 300 may have a length and width that are each significantly greater (e.g., at least three or four times greater) than the thickness of support web 300.

In some embodiments, filaments 310 may comprise randomly and irregularly oriented loops, curls, and generally non-linear (over distances greater than e.g. 10 mm) sections of filaments and the like, that collectively define support web 300 with a thickness and with first major side 330 and first major surface 335 and second major side 320 and second major surface 325. Webs of this general type are often referred to as coil webs by those of skill in the art. In particular embodiments, support web 300 may comprise overlapping rows of irregularly looped and intermingled filaments that form a highly open three dimensional sheet structure, as described in further detail e.g. in U.S. Pat. Nos. 4,212,692, 4,252,590, and 6,272,707, herein incorporated by reference for this purpose. Webs of this type are available from Colbond Geosynthetics Company of St. Denis la Plaine, France, under the trade designation ENKAMAT. Other webs that may also serve include those webs available from Colbond under the trade designation ENKADRAIN, those webs available under the trade designation FORTRAC from Huesker Synthetic GmbH of Gescher, Germany; and those webs available under the trade designation TENSAR MAT from Tensar International SARL of Mérignac, France. In some embodiments, support web 300 may comprise a coherent bonded-fiber nonwoven web made of inter-engaged continuous coiled or three-dimensionally undulated filaments of resilient thermoplastic polymer. At least some of the filaments are autogeneously bonded together or removably welded together at points of mutual contact to form a handleably integrated structure. The web may optionally comprise abrasive granules dispersed throughout the web and bonded to the filaments by binder. Examples of webs of this type are disclosed in U.S. Pat. Nos. 3,837,988 and 4,227,350, which are incorporated herein by reference. Webs of this type are available from 3M Company, St. Paul, Minn. under the trade designation NOMAD.

However made and of whatever specific structure, support web 300 comprises interior void spaces 350 that are capable of receiving multicomponent fibers 110 so as to form embedded web 100, as described in detail later herein. Interior void spaces 350 thus should comprise sufficient space to accommodate fibers 110, and should be at least partially connected (e.g., fluidly connected in a generally line-of-sight manner) to major surface 325 or major surface 335 of support web 300 (e.g. with there being a sufficiently small and/or widely spaced or separated number of filaments 310 between an interior void space 350 and major surface 325 or 335), so that fibers 110 can be satisfactorily deposited therein. Individual interior void spaces 350 may or may not be connected (e.g., line-of-sight fluidly connected) to each other. Boundaries between different void spaces 350 may not be always easily discernable.

To enhance the ability to infill multicomponent fibers 110 within interior void spaces 350 of support web 300, in various embodiments individual void spaces 350 may comprise an average size of at least about 3 mm, at least about 6 mm, or at least about 9 mm. In this context, size means the distance across a given void space that may be traversed before encountering one or more filaments so located and/or oriented as to prevent the passage of multicomponent fibers 110 (as described herein) therepast. In further embodiments, void spaces 350 may comprise an average size of at most about 20 mm, at most about 15 mm, or at most about 12 mm. A wide variation or distribution of void sizes may be present. In some embodiments, void spaces 350 may be distributed generally isotropically through out the thickness, width and length of support web 300. Such an isotropic support web is pictured in exemplary manner in FIG. 2.

Figure 3:
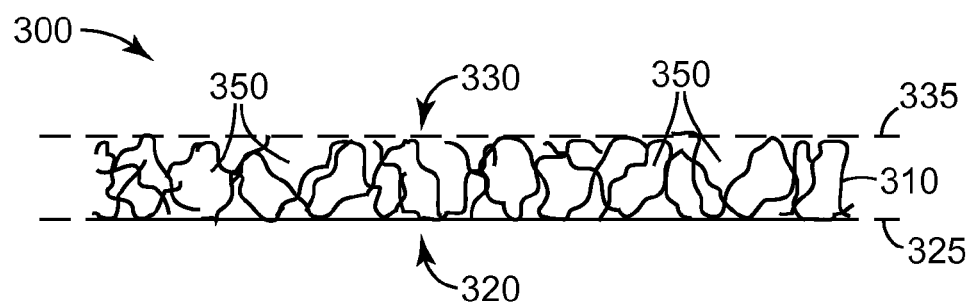
FIG. 3 is a cross sectional view of another exemplary support web as disclosed herein.

In alternative embodiments, void spaces 350 may be asymmetrically distributed within support web 300. In further embodiments, void spaces 350 may comprise a discernable orientation with respect to the thickness of support web 300, in which at least some individual interior void spaces 350 may each comprise a generally open end at first major surface 335 of support web 300, and a generally closed end at second major surface 325 of support web 300. By generally open is meant that sufficiently few filaments 310 are present at this end of void space 350 (e.g., at first major surface 335 of support web 300) that fibers can be infilled into void space 350 from first major side 330 of support web 300. By generally closed is meant that a sufficient number of filaments 310 are present at this end of void space 350 (e.g., at second major surface 325 of support web 300) that fibers cannot be infilled from second major side 320 of support web 300. An exemplary arrangement of this type is shown in FIG. 3. In structures of this general type, individual interior void spaces 350 may take the form of pockets which may extend from an open end at first major surface 335 of support web 300, to a closed end at or near second major surface 325 of support web 300. A specific embodiment of this type is one in which first major surface 335 of support web 300 is characterized by a generally open structure, and in which second major surface 325 of web 300 is characterized by a generally closed structure in which filaments 310 on major surface 325 of web 300 take the general form of loops, swirls, and the like, that are flattened and coplanar so as to define the plane of major surface 325. Such a configuration, which is shown in exemplary manner in FIG. 3, may be achieved e.g. by collecting filaments 310 (in the process of forming support web 300), on a flat and/or heated surface (e.g. a metal drum or belt) such that still molten or at least partially softened filaments 310 that contact the flat surface and/or heated surface may tend to flatten out and to collect in a generally coplanar configuration.

Support web 300 may comprise any suitable thickness, basis weight, and the like. In various embodiments, support web 300 is at least about 7 mm, at least about 10 mm, or at least about 12 mm, in thickness. In further embodiments, support web 300 is at most 40 mm, at most about 35 mm, or at most about 30 mm, in thickness. In various embodiments, support web 300 may comprise a basis weight of at least 50 gsm (grams per square meter), at least 100 gsm, or at least 200 gsm. In further embodiments, support web 300 may comprise a basis weight of at most 2000 gsm, 1000 gsm, or 600 gsm. In various embodiments, filaments 310 of support web 300 may comprise an average diameter of at least 200 microns, at least 400 microns, or at least 600 microns.

Support web 300 may comprise particles, e.g. abrasive particles, as desired, including any of the abrasive particles disclosed herein. Such abrasive particles may be attached to filaments 310 of web 300 e.g. by a binder, as is well known in the art.

Figure 4:
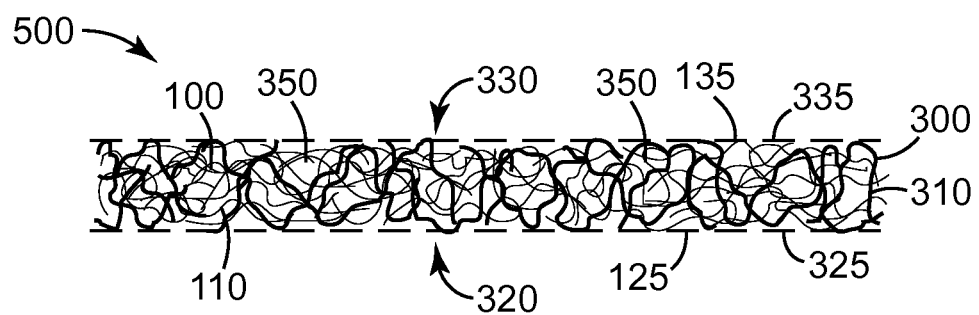
FIG. 4 is a cross sectional view of an exemplary porous supported article as disclosed herein.
Figure 5:
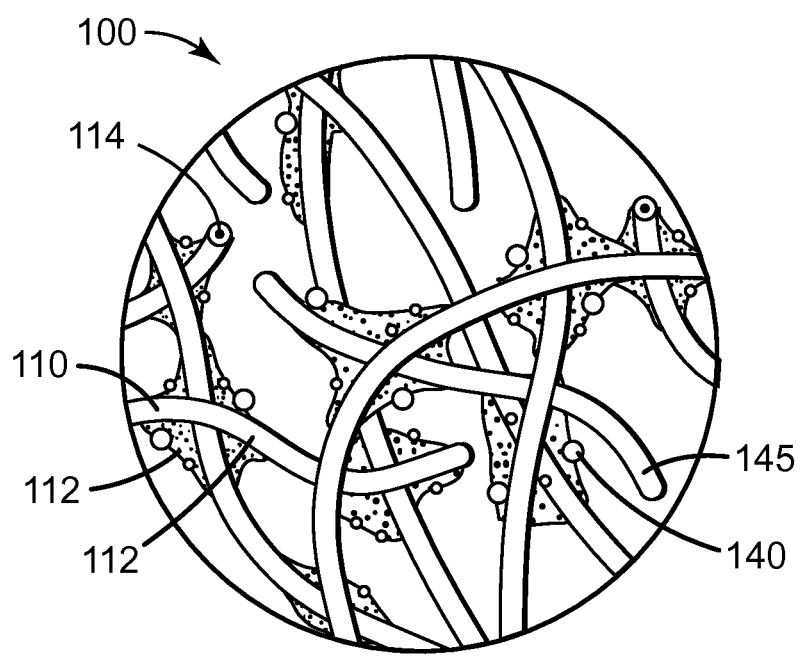
FIG. 5 is an exploded cross sectional view of a portion of an exemplary embedded web as disclosed herein.

Shown in FIG. 1, in FIG. 4, and in exploded cross sectional view in FIG. 5, is embedded web 100. Embedded web 100 may be formed by infilling multicomponent fibers 110 into interior void spaces 350 of support web 300, and then self-bonding at least some of fibers 110 to each other, by methods described herein. Embedded web 100 comprises at least multicomponent fibers 110 and comprises first major surface 135 and second major surface 125 (which are both comprised of fibers and as such may be porous and/or discontinuous). Multicomponent fibers 110 are defined as fibers having at least a first major polymeric portion (component) 112 with a first melting point and a second major polymeric portion (component) 114 with a higher melting point than that of portion 112. Such multicomponent fibers may be bicomponent fibers, or may have additional components as well. Upon exposure to an appropriate elevated temperature, first portion 112 may at least partially melt, while second portion 114 with a higher melting point may remain generally intact. During melting, the first portion 112 may tend to collect at junction points where fibers contact each other, e.g. as shown in FIG. 5. Then, upon cooling, the material of the first portion 112 may resolidify and in so doing bond at least some of the fibers 110 to each other (such a process is commonly known as melt-bonding). This process is defined herein as self-bonding. Those of skill in the art will appreciate the difference between a self-bonded web formed by such self-bonding of major polymeric components of the fibers, and webs formed by bonding fibers together by the use of an applied binder or adhesive that is not a major polymeric component of the fibers, webs formed by using mechanical processing steps (e.g., such as needle-tacking, hydroentangling, and the like) to transform a collection of fibers into a web, and the like.

The use of multicomponent fibers 110 thus provides for self-bonding at least some of fibers 110 to each other such that web 100 comprises an embedded web. The term embedded web means that a sufficient number of the multicomponent fibers 110 of web 100 are self-bonded to each other to form a coherent, three dimensional network, and that a sufficient number of the multicomponent fibers 110 of web 100 are entangled with, wrapped around, and/or melt-bonded to, at least some of the filaments 310 of supporting web 300, that web 100 cannot be removed from the interior spaces 350 of support web 300 without causing damage to either web 100 or web 300. (Such damage may involve e.g. breakage of fibers 110 and/or filaments 310, rupture of the self-bonds between fibers 110, permanent deformation of web 100 and/or web 300, and the like). Embedded web 100 may be provided in this manner without the need of an additional resin coating, binder, or adhesive, to be present in embedded web 100, and without the use of a mechanical processing step (e.g., such as needle-tacking, hydroentangling, and the like) to transform form fibers 110 into embedded web 100.

Multicomponent fibers 110 may be discontinuous (defined for purposes of this disclosure as meaning less than 30 mm long). In some embodiments, discontinuous fibers 110 may be cut fibers (e.g., chopped, from longer length and/or continuous fibers). In some embodiments, multicomponent fibers 110 may comprise a mixture of longer fibers and shorter fibers. In various embodiments, fibers 110 may comprise a Denier of at least one, or at least two, or at least three. In further embodiments, fibers 110 may comprise a Denier of less than about 20, less than about 10, or less than about 5. In some embodiments, multicomponent fibers 110 may comprise a mixture of higher Denier (larger diameter) fibers and lower Denier (smaller diameter) fibers.

Multicomponent fibers 110 may be synthetic polymeric fibers, for example bicomponent fibers, with at least a first major polymeric portion with a first melting point and a second major polymeric portion with a second melting point that is higher (e.g., 20, 40, or 60 degrees C. higher or more) than the first melting point. Often, polyolefins (e.g., polyethylene or copolymers thereof) may be used for the first, lower melting point component, and polyesters (e.g., PET and the like) may be used for the second, higher melting point component. Or, certain polyolefins (e.g. polyethylene) may be used for the first component and other, higher melting point polyolefins (e.g., polypropylene) may be used for the second component. Or, certain polyesters (e.g. polybutylene succinate) may be used for the first component and other polyesters (e.g., polyethylene terephthalate succinate) may be used for the second component. One or both of the components may be biodegradable, if desired.

Multicomponent fibers, e.g. bicomponent fibers, may be used that have e.g. a coextensive side-by-side configuration, a coextensive concentric sheath-core configuration (e.g., as in the exemplary embodiment of FIG. 5), or a coextensive elliptical sheath-core configuration. Other arrangements (e.g., layered structures, lobed structures, segmented structures, islands-in-the-sea structures, matrix-fibril, and so on) are also possible.

In addition to first major polymeric portion 112 and second major polymeric portion 114, multicomponent fibers 110 may comprise any of the additives known to those of skill in the art. Such additives may include plasticizers, processing aids, pigments, antioxidants, stabilizers, compatibilizing agents, impact-resistance modifiers, pigments, mineral fillers, dyes, surfactants, lubricants, and so on.

Exemplary materials that may be used as multicomponent fibers 110 may include materials available from Minifibers, Inc. of Johnson City, Tenn., under the trade designation Bicomponent Fibers, material available from KoSa Co. of Wichita, Kans., the under the trade designation CELBOND 254, materials available from Trevira GMBH of Bobingen, Germany, under the trade designation Bicomponent Fibres, materials available from available from Unitika Co. of Osaka, Japan, under the trade designation MELTY, materials available from Huvis Corporation of Seoul, Korea under the trade designation LMF, materials available from Invista Corp of Wichita, Kans. under the trade designations T 254 and T 256, materials available from Chisso Inc. of Osaka, Japan, under the trade designations Chisso ES, ESC, EAC, EKC, EPC and ETC, and material available from Nan Ya Plastics Corporation of Taipei, Taiwan, under the trade designation Type LMF.

In some embodiments, all of the total fiber content of embedded web 100 is supplied by multicomponent fibers 110. In alternative embodiments, optional filling fibers 145 are blended with the multicomponent fibers 110. Filling fibers 145 are any kind of fiber other than a multicomponent fiber. Examples of filling fibers 145 include single component synthetic fibers, semi-synthetic fibers, metal fibers, natural fibers, mineral fibers, and so on. In various embodiments, filling fibers 145 may comprise up to about 30% by weight, up to about 20% by weight, or up to about 10% by weight, of embedded web 100.

Embedded web 100 may comprise any suitable thickness, basis weight, and the like. In various embodiments, embedded web 100 is at least about 2 mm, at least about 5 mm, or at least about 10 mm, in thickness. In further embodiments, embedded web 100 is at most 40 mm, at most about 30 mm, or at most about 20 mm, in thickness. The thickness of embedded web 100 may be selected or controlled relative to the thickness of support web 300, as discussed in detail later herein. In various embodiments, embedded web 100 may comprise a basis weight of at least about 50 gsm (grams per square meter), at least about 100 gsm, or at least about 200 gsm. In further embodiments, embedded web 100 may comprise a basis weight of at most about 2000 gsm, at most about 1000 gsm, or at most about 500 gsm.

If desired, embedded web 100 may comprise an optional binder. Such a binder may be present e.g. on a major surface of and/or throughout the thickness of embedded web 100. The binder may be a resin (e.g. phenolic resins, polyurethane resins, polyureas, styrene-butadiene rubbers, nitrile rubbers, epoxies, acrylics, and polyisoprene). The binder may be water soluble, as is well known in the art.

Embedded web 100 may optionally comprise particles, and support web 300 may also optionally contain particles. While such particles are discussed herein primarily in the context of particles 140 of embedded web 100, it is understood that any of the herein-described particles may be present in support web 300. Such particles can be any discrete particle, which is a solid at room temperature, that is added e.g. to provide a cleaning, scouring, polishing, wiping, absorbing, adsorbing, or sensory benefit. In various embodiments, such particles may comprise an average diameter of less than about 1 cm, less than about 5 mm, less than about 2 mm, or less than about 1 mm. In further embodiments, such particles may comprise an average diameter of at least about 50 microns, at least about 100 microns, or at least about 250 microns.

In some embodiments, particles 140 are abrasive particles. Abrasive particles may be used to provide an abrasive porous embedded web 100 that can scour and abrade difficult to remove material. Abrasive particles may be mineral particles, synthetic particles, natural abrasive particles or a combination thereof. Examples of mineral particles include aluminum oxide such as ceramic aluminum oxide, heat-treated aluminum oxide and white-fused aluminum oxide; as well as silicon carbide, alumina zirconia, diamond, ceria, cubic boron nitride, garnet, flint, silica, pumice, and calcium carbonate. Synthetic particles include polymeric materials such as polyester, polyvinylchloride, methacrylate, methylmethacrylate, polycarbonate, melamine, and polystyrene. Natural abrasive particles include nutshells such as walnut shell, or fruit seeds such as apricot, peach, and avocado seeds. Various sizes, hardness, and amounts of abrasive particles may be used to create an abrasive porous layer ranging from very strongly abrasive to very lightly abrasive. In some embodiments particles 140 are metal, and e.g. may be used to provide a polishing layer.

In some embodiments, particles 140 are solid materials typically found in detergent compositions, such as surfactants and bleaching agents. Examples of solid surfactants include sodium lauryl sulfate and dodecyl benzene sulfonate. Other examples of solid surfactants can be found in "2008 McCutcheon's Volume I: Emulsifiers and Detergents (North American Edition)" published by McCuthcheon's Division. Examples of solid bleaching agents include inorganic perhydrate salts such as sodium perborate mono- and tetrahydrates and sodium percarbonate, organic peroxyacids derivatives and calcium hypochlorite.

In some embodiments, particles 140 are solid biocides or antimicrobial agents. Examples of solid biocide and antimicrobial agents include halogen containing compounds such as sodium dichloroisocyanurate dihydrate, benzylkoniumchloride, halogenated dialkylhydantoins, and triclosan.

In some embodiments, particles 140 are microcapsules, e.g. as described in U.S. Pat. No. 3,516,941. The microcapsules may be loaded with solid or liquid fragrance, perfume, oil, surfactant, detergent, biocide, or antimicrobial agents, and may be broken by mechanical stress in order to release the material contained within them.

In some embodiments, particles 140 are adsorbent or absorbent particles. For example, adsorbent particles could include activated carbon, charcoal, sodium bicarbonate, and the like. In certain embodiments, particles 140 are absorbent (i.e., able to absorb significant quantities of liquid water and/or aqueous compositions, solutions, and mixtures). For example, absorbent particles could include porous material, natural or synthetic foams such as melamine, rubber, urethane, polyester, polyethylene, silicones, and cellulose. The absorbent particles could also include superabsorbent particles such as sodium polyacrylates, carboxymethyl cellulose, or granular polyvinyl alcohol.

In particular embodiments, particles 140 may comprise chopped cellulosic sponge particles or chopped urethane sponge particles or mixtures thereof. Such particles may be advantageously provided by e.g. chopping of waste sponge material left over from the production of conventional monolithic cellulosic or urethane sponges. Embedded web 100 with e.g. cellulosic sponge particles 140 bonded therein may be highly hydrophilic and water-absorbent.

Those of ordinary skill in the art will appreciate that any combination of one or more of the above described particles 140 may be used within embedded web 100 and/or within supporting web 300. Depending on the desired attributes of embedded web 100, a variety of loadings of particles 140 relative to multicomponent fibers 110 (and filling fibers 145 if included) may be used. In various embodiments, particles 140 may comprise less than about 90, less than about 80, or less than about 70, % by weight of the total weight of embedded web 100. In further embodiments, particles 140 comprise at least 10, at least 20, or at least 30, % by weight of the total weight of embedded web 100.

Figure 6:
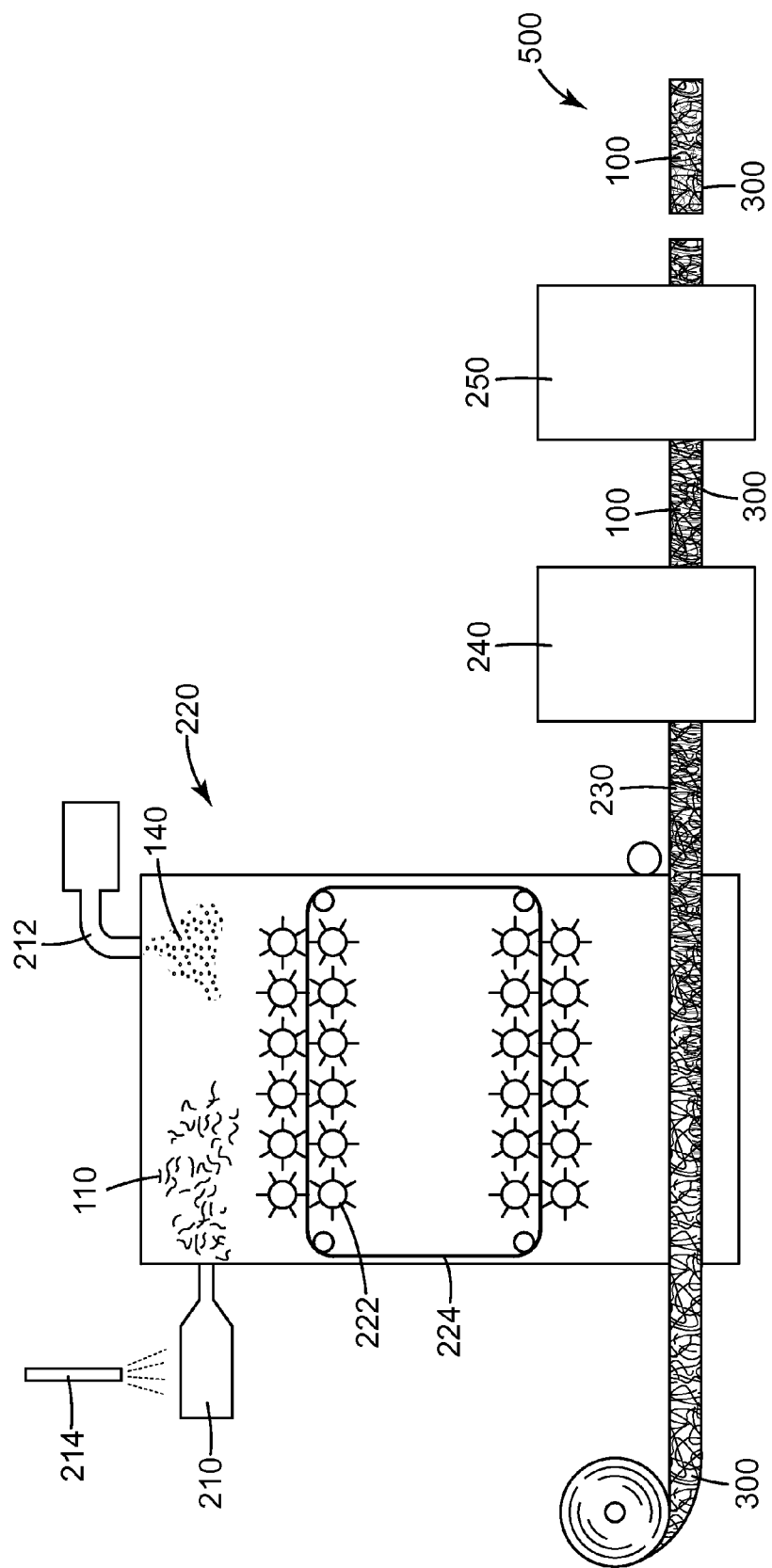
FIG. 6 is a side view in partial cutaway showing an exemplary process for making a porous supported article, as disclosed herein

FIG. 6 is a side view (with chamber 220 in cutaway) showing an exemplary process of making porous supported article 500. A fiber input stream 210 introduces fibers (i.e., including multicomponent fibers 110) into forming chamber 220 where the fibers are mixed, blended, and ultimately infilled into support web 300. By infilled it is meant that the mixed fibers 110 (along with filling fibers 145 and/or particles 140, if present) are deposited, by the action of gravity along with application of at least partial vacuum, into at least some of interior void spaces 350 of support web 300, so as to form a fibrous mat 230 that at least partially fills at least some of interior void spaces 350 of support web 300. Prior to entering forming chamber 220, an opener (not shown) may be included to open, comb, and/or blend the input fibers, particularly if a blend of multicomponent fibers 110 and filling fibers 145 are included. If desired, particles 140 may also be introduced into forming chamber 220, e.g. by way of particle input stream 212. While fiber input stream 210 and/or particle input stream 212 may be advantageously positioned generally toward the upper portion of forming chamber 220, it is understood that either or both of these may be positioned at other portions of forming chamber 220.

Forming chamber 220 is a type of dry-laying fiber processing equipment, such as shown and described in US Patent Application Publication 2005/0098910 titled "Fiber distribution device for dry forming a fibrous product and method," the disclosure of which is herein incorporated by reference. Instead of using strong air flow to mix and interengage the fibers to form a mat (such as with a "RandoWebber" web forming machine, available from Rando Machine Corporation, Macedon, N.Y.), forming chamber 220 has spike rollers 222 to mechanically blend and mix the fibers while gravity allows the fibers to fall down through moving endless belt screen 224 and to ultimately be infilled into support web 300 to form fibrous mat 230 comprised of e.g. unbonded fibers. In this design, the mixed fibers (and particles 140, if present) fall (i.e., are gravity-dropped) toward the bottom of the forming chamber 220 to be infilled into support web 300 so as to form fibrous mat 230. In general, multicomponent fibers 110 are processed in chamber 220 at temperatures significantly lower (e.g., at least 30° C. lower) than the melting temperatures of any portion (e.g., first portion 112) of multicomponent fibers 110.

Various fibers, and optional particles if desired, can be added in this manner, as explained herein and as further discussed in U.S. patent application Ser. No. 12/251,048, filed Oct. 14, 2008, entitled Nonwoven Material Containing Benefiting Particles and Method of Making; which is herein incorporated by reference.

Support web 300 may either be passed into and through a lower portion of forming chamber 220, or may be passed underneath an opening in the bottom of forming chamber 220, so that mixed fibers 110 can be infilled therein. Support web 300 may be so passed as a free-standing, self-supporting layer; or it may be residing upon, or carried by, a portion of an endless fiber-collection belt of the type often used in airlaying equipment. An at least partial vacuum may be applied to the bottom surface (e.g., major surface 335) of support web 300, by way of which a pressure differential can be applied through the thickness of support web 300 to assist in the infilling of fibers 110 into support web 300. If a supporting belt or screen is used (e.g., beneath support web 300 and at least partially supporting it from beneath), such a belt or screen may be porous so that the vacuum can be applied through it.

Support web 300 with infilled fibrous mat 230 therein then proceeds to heating unit 240, such as an oven, in which an elevated temperature exposure is performed. This elevated temperature serves a first purpose of exposing fibrous mat 230 to a temperature at which first portions 112 of multicomponent fibers 110 of fibrous mat 230 may at least partially melt to bond at least some of fibers 110 to each other to transform fibrous mat 230 into an embedded web 100 as described herein (these melt-bonding processes may not be fully completed until the materials are cooled subsequent to the elevated temperature exposure such that first portions 112 of fibers 110 resolidify, of course). The elevated temperature exposure may also serve to melt-bond at least some of particles 140 (if present) to fibers 110. The elevated temperature exposure may also serve to melt-bond at least some of fibers 110 to at least some of filaments 310 of support web 300. If desired, in some embodiments at least a portion of at least some of filaments 310 may be comprised of a material similar to, or the same as, first portion 112 of multicomponent fibers 110, to enhance this bonding. This may not be necessary in order to satisfactorily provide embedded web 100, however.

The result of this process is the production of a porous supported web comprising support web 300 with embedded web 100 therein. This web can then be separated (e.g., cut) through its thickness to form porous supported articles 500 as shown in FIG. 6. The forming of such structures by infilling multicomponent fibers 110 into interior void spaces 350 of support web 300 so as to form an embedded web therein is to be contrasted with the conventional temporary deposition of a fibrous mat onto an endless fiber-collection belt and the subsequent removal of the web formed therefrom from the endless belt.

In some embodiments, the processes described herein may be operated such that optional particles 140 are incorporated into fibrous mat 230 (and ultimately reside within embedded web 100 formed therefrom) throughout the thickness of mat 230 (e.g., generally uniformly through out the thickness of mat 230). In some cases this may be enhanced by optionally introducing liquid solution 214, such as an aqueous solution, into chamber 220. The liquid solution 214 may wet at least some of the fibers so that particles 140 cling to the surface of the fibers, which may enhance the dispersing of particles 140 generally throughout the thickness of mat 230. (When mat 230 proceeds to heating unit 240, the liquid solution 214 may evaporate and play no further role in the processing). In other embodiments, particles 140 may reside e.g. preferentially on or near major surface 135 of web 100. This may be provided e.g. when the mat 230 is a relatively dense web with small openings, such that particles 140 remain preferentially on or near the uppermost surface of mat 230.

Elevated temperature exposure may be achieved e.g. by use of any suitable heating unit or units 240, e.g. one or more ovens. In particular embodiments, heating unit 240 may comprise a so-called through-air bonder, in which heated air under positive pressure is forced through the thickness of fibrous mat 230 and embedded web 100 formed therefrom so as to enhance the uniformity of the temperature exposure and to promote uniform bonding. In other embodiments, either in place of, or in addition to, such an oven exposure and/or through-air bonding, the elevated temperature exposure may occur with the application of pressure, e.g. by passing support web 300 containing fibrous mat 230/embedded web 100 through one or more heating units 240 comprising sets of heated calendering rolls, belts or the like. In such cases, support web 300 and/or fibrous mat 230/embedded web 100 may be at least slightly compressed, e.g. such that the final thickness of article 500 may be somewhat less than the initial thickness of support web 300.

In some embodiments a generally isotropic support web 300 (e.g., of the type represented by the exemplary web of FIG. 2) may be used, such that multicomponent fibers 110 are infilled generally uniformly into support web 300 (e.g., as in the exemplary design of FIG. 4). In other embodiments, at least some of the interior spaces 350 of support web 300 may be anisotropically distributed and/or oriented within support web 300 (e.g., as shown in the exemplary design of FIG. 3). In such cases, embedded web 100 may be distributed anisotropically throughout interior spaces 350 of support web 300 (e.g., as shown in the exemplary design of FIG. 7). For example, embedded web 100 may be present in pockets that are distributed throughout the length and width of support web 300 and that extend across a portion of, or across nearly all of, the thickness of support web 300 (e.g., from near one major surface of support web 300 to near another major surface of support web 300). In particular embodiments in which anisotropic support web 300 comprises (as described above) a generally closed surface and a generally open surface, it may be advantageous to perform the deposition of fibers 110 from first major side 330 of support web 300 bearing generally open first major surface 335, so that fibers 110 are most easily able to penetrate into the void spaces 350.

The length of multicomponent fibers 110 may be chosen in combination with the size of void spaces 350 to enhance the infilling. In various embodiments, multicomponent fibers 110 may comprise an average length (e.g., the nominal length listed by the fiber manufacturer) of less than about 15 mm, less than about ten mm, or less than about eight mm. In general, multicomponent fibers 110 may be sufficiently long that a satisfactorily coherent web structure can be formed therefrom. In various embodiments, multicomponent fibers 110 may comprise an average length of at least 1 mm, at least 2 mm, or at least 3 mm. In some embodiments, the average length of multicomponent fibers 110 may be chosen to be less than the above-described average size of void spaces 350.

Figure 8:
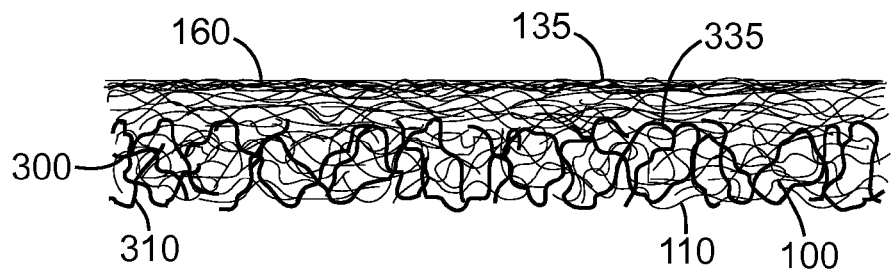
FIG. 8 is a cross sectional view of another exemplary porous supported article as disclosed herein.

The processes, designs and materials disclosed herein may be varied as desired, so as to produce porous supported articles 500 with different configurations, properties and functionalities. Thus in some embodiments, multicomponent fibers 110 may be infilled into support web 300 so that embedded web 100 comprises a substantially similar thickness to that of support web 300; e.g., so that major surface 125 of embedded web 100 is positioned approximately even with (e.g., within about 1-2 mm of) major surface 325 of support web 300, and so that major surface 135 of embedded web 100 is positioned approximately even with major surface 335 of support web 300 (as in FIG. 4). In other embodiments, multicomponent fibers 110 may be deposited so that embedded web 100 extends outward beyond a major surface of support web 300. For example, in the exemplary design of FIG. 8, major surface 135 of embedded web 100 is located outward from major surface 335 of support web 300.

In some embodiments it may also be useful to deposit at least a second layer of multicomponent fibers atop a major surface of support web 300, to form at least a second web formed therefrom, present in addition to embedded web 100. Such a second web may be formed atop any suitable major surface of support web 300 (e.g., atop a generally closed surface, if present). Methods and apparatus which may be used to deposit a layer of multicomponent fibers atop a major surface of a porous surface without necessarily significantly and/or substantially filling the interior of the porous substrate with multicomponent fibers so as to form a web embedded therein are disclosed in detail in copending and commonly assigned U.S. patent application Ser. No. 61/253,580, entitled "Porous Multilayer Articles and Methods of Making", filed on evendate herewith and incorporated by reference herein.

In still other embodiments, multicomponent fibers 110 may be deposited so that embedded web 100 only partially fills the thickness of support web 300. For example, in the exemplary design of FIG. 9, major surface 135 of embedded web 100 is located inward from major surface 335 of support web 300. Those of skill in the art will recognize that one or both major surfaces 125 and/or 135 of embedded web 100 may be undulating (as opposed to e.g. generally planar).

Various steps, e.g. post-processing steps, as performed e.g. by post-processing unit 250 of FIG. 6, may be performed e.g. to add strength, texture, and/or specific properties or capabilities to finished article 500. For example, a partially or completely densified skin 160 may be provided at major surface 135 of embedded web 100 (as shown in the exemplary design of FIG. 8). This may be achieved e.g. by exposing surface 135 of embedded web 100 to localized heat so as to more aggressively melt and/or bond the fibers together in this region. Additional coatings, e.g. binder coatings, may be applied, e.g. to major surface 135 of embedded web 100. Such binder coatings may be used e.g. to provide particles (e.g., any of the abrasive particles 140 mentioned herein) on or near surface 135 of embedded web 100.

Those of skill in the art will appreciate that a variety of articles can be made from the above-described support web 300 and embedded web 100, involving any suitable combination of the components and properties listed thereof. Many such products may be useful e.g. in scrubbing applications (e.g. for scrubbing of surfaces), whether such scrubbing is performed by hand or by the operation of machinery (e.g., floor scrubbers and the like). Such products may be particularly useful in the scrubbing of nonuniform surfaces, e.g. tiled floors, tiled countertops, and the like. Specifically, an advantage of at least some embodiments disclosed herein is that filaments 310 of support web 300 may act as internal springs within embedded web 100, so as to provide embedded web 100 with local resiliency so as to be able to adjust to nonuniform surfaces.

As may be desirable for certain scrubbing applications (e.g., floor scrubbing), abrasive particles 140 may be deposited on major surface 135 of embedded web 100, and/or within at least some of the interior of embedded web 100, as mentioned herein. Configurations into which article 500 might be placed to enhance its use for such purposes are discussed in more detail e.g. in U.S. Pat. Nos. 4,893,439, 6,234,886, and U.S. Patent Application Publication 2007/0298697, all of which are incorporated by reference herein for this purpose.

Figure 9:
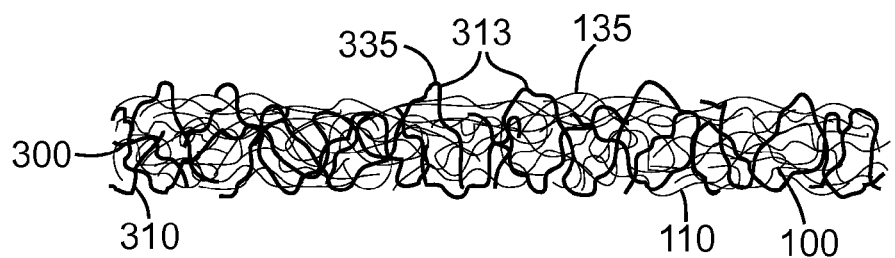
FIG. 9 is a cross sectional view of another exemplary porous supported article as disclosed herein.

In still other scrubbing applications, it may be advantageous to use a configuration of the type exemplified by FIG. 9, in which at least some portions 313 of filaments 310 of support web 300 protrude outwardly beyond a major surface of embedded web 100. In such designs, protruding filament portions 313 can act to dislodge debris from narrow gaps or crevices, while support web 300 may serve to receive such dislodged debris, to absorb liquids, and the like. Such methods may be particularly useful e.g. in the scrubbing of surfaces such as the bottom of shoe soles, and are described in more detail in Published International Patent Application WO2008/051819, incorporated by reference herein for this purpose.

Those of skill in the art will appreciate that article 500 as described herein may be used in situations where article 500 is moved relative to the surface to be scrubbed (e.g., as a floor scrubbing pad, surface finishing pad, scouring pad, e.g., for use with a rotary cleaning machine or by hand), as well as scrubbing applications in which article 500 is held stationary and the surface to be scrubbed is moved relative to article 500 (e.g., as a floor mat and the like). Uses other than scrubbing may also be envisioned.

It will thus be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

EXAMPLES

Porous supported articles were produced via the use of an apparatus and process generally similar to that shown in FIG. 6. Multicomponent fibers were obtained from Trevira GMBH of Bobingen, Germany under the trade designation 255. The fibers were sheath-core bicomponent fibers (sheath composed of co-polyethylene, core composed of polyester (PET)), of 2.2 dtex, with average length approximately 6 mm.

A support web was obtained from Colbond Geosynthetics Company of St. Denis la Plaine, France under the trade designation ENKAMAT 7225. The web comprised irregularly looped and intermingled filaments that formed a highly open three dimensional sheet structure. One side of the web comprised a generally closed surface in which filaments were in the form of flattened, coplanar, loops and swirls. The other side of the web comprised a generally open surface such that numerous interior void spaces were open to this side of the web. The web was thus of the general type represented by FIG. 3.

A forming chamber of the type shown in FIG. 6 was brought to appropriate steady-state operating conditions, in which the multicomponent fibers were processed by the spike rollers and the endless belt screen and then were gravity-dropped toward the bottom of the forming chamber onto an endless fiber-collection belt (a porous, mesh screen) that ran horizontally underneath the bottom of the forming chamber. A length of the above-described support web was placed onto the endless fiber-collection belt with the generally open surface of the support web facing up. The support web was passed underneath the forming chamber at a speed of approximately 1 meter per minute. This speed was calculated in combination with the feed rate of multicomponent fibers into the forming chamber to produce a deposited (infilled) fibrous mat of total basis weight of approximately 330 gsm (measured above and beyond the weight of the support web). A (partial) vacuum was applied to the underside of the porous endless belt to assist in the deposition.

The fibers were infilled into interior void spaces of the support web, with at least some of the fibers penetrating substantially through the interior spaces of the support web so as to reside near to or against the interior side of the generally closed surface of the support web (with these infilled fibers being separated from the outside of the support web at least by the fiber thickness of the looped and swirled fibers of the generally closed surface of the support web). The fibers infilled the accessible interior void spaces of the support web so as to provide pockets filled with multicomponent fibers, the pockets being interspersed (along the length and width of the support web) among spaces not filled with multicomponent fibers (e.g., void spaces of the support web in which filaments of the support web largely prevented the multicomponent fibers from penetrating into these spaces). The deposition was carried out so that the upper surface of the fibrous mat of multicomponent fibers was slightly above (e.g., approximately 1 mm or less above) the top (generally open) surface of the support web.

The support web with the fibrous mat therein was then passed through two heating units in succession (two units were used because of the relatively small size and heating capacity of the units available). The first heating unit was an oven containing flowing air at a temperature of approximately 160° C. The residence time of the stack in the first heating unit was approximately five minutes. The second heating unit was an oven containing flowing air at a temperature of approximately 160° C. The second oven also contained endless belts (comprised of a netting), through which the support web with fibrous mat therein was passed two times in succession. The gap between the belts was set sufficiently far apart that the belts did not apply pressure to the support web and fibrous mat therein. The residence time of the stack during each pass through the second heating unit was approximately one to two minutes.

The elevated temperature exposures served to self-bond the particle-containing fibrous mat into a coherent porous web that was embedded within the support web and could only be removed with difficulty and with damage and tearing of the embedded web.

Figure 7:
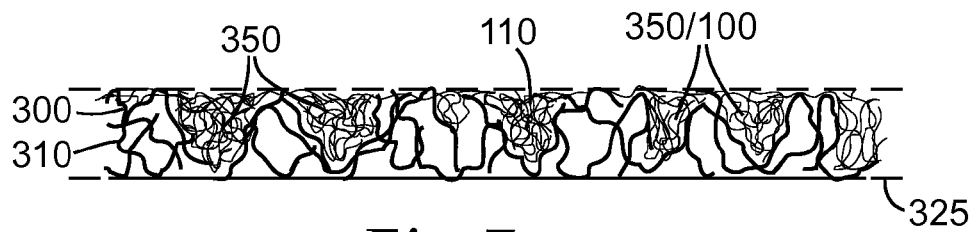
FIG. 7 is a cross sectional view of another exemplary porous supported article as disclosed herein.

In this manner were produced porous supported articles of approximately 20 mm in thickness, comprising a support web of thickness approximately 20 mm and with pockets of embedded web therein (e.g., similar in appearance to the exemplary design of FIG. 7). The top surface of the embedded web was slightly above (e.g., approximately 0.1-0.5 mm above) the top surface of the support web (so that no portion of any filament of the support web protruded above the top surface of the embedded web) with a continuous layer of embedded web material thus being present over all of the top surface of the porous supported article. The top surface of the embedded web was gently undulating and appeared to comprise a slightly densified surface layer.

Numerous experiments of this type were conducted. Some experiments were conducted similar to the above but with the multicomponent fibers deposited to a basis weight of approximately 165 gsm.

What is claimed is:

1. A method of making a porous supported web, comprising:
    introducing discontinuous multicomponent polymeric fibers into a forming chamber;
    mixing the multicomponent fibers within the forming chamber;
    infilling the multicomponent fibers into at least some interior void spaces of a filamentary support web comprising a thickness, to form an infilled fibrous mat within at least some of the interior void spaces of the support web; and,
    exposing the multicomponent fibers to an elevated temperature to melt-bond at least some of the multicomponent fibers to each other so that the fibrous mat is self-bonded into a porous web that is embedded within at least some of the interior void spaces of the support web;
        wherein the infilled multicomponent fibers partially fill the thickness of the filamentary support web so that the entirety of the porous embedded web is located within the thickness of the filamentary support web so that first and second major surfaces of the porous embedded web are within the interior of the filamentary support web and so that at least some of the filaments of the filamentary support web extend outwardly from the porous embedded web beyond a major surface of the porous embedded web.

2. The process of claim 1 wherein the infilling of the multicomponent fibers into the interior void spaces of the support web is performed by passing the support web through or underneath the forming chamber and gravity-dropping the multicomponent fibers into the support web, and wherein the elevated temperature exposure is achieved by passing the support web with the infilled fibrous mat therein through a heating unit that is separate from the forming chamber.

3. The process of claim 2 further comprising applying at least a partial vacuum to a major surface of the support web such that a pressure differential exists through the support web to assist the infilling of the multicomponent fibers into interior void spaces of the support web.

4. The process of claim 1 wherein at least one of the first and second major surfaces of the porous embedded web comprises a densified surface layer.

5. The process of claim 1 wherein the support web has a generally closed first major surface that comprises a plurality of flattened, coplanar filament loops, and has a generally open second major surface that is defined by portions of filaments that are distal to the first major surface of the support web, and wherein the infilling of the multicomponent fibers into the support web is performed by infilling the fibers into the generally open second major surface of the support web.

6. The process of claim 1 wherein the filaments of the support web have an average diameter of at least about 200 microns.

7. The process of claim 1 wherein the multicomponent fibers comprise a Denier of between about 1 and about 5.

8. The process of claim 1 further comprising introducing particles into the forming chamber, mixing the particles with the multicomponent fibers, infilling the particles and multicomponent fibers into the support web, and exposing the multicomponent fibers and the particles to an elevated temperature to melt-bond at least some of the multicomponent fibers to each other and to melt-bond at least some of the particles to at least some of the multicomponent fibers to form a porous, particle-containing web that is embedded within at least some of the interior void spaces of the support web.

9. The process of claim 8 wherein the particles are selected from the group consisting of abrasive particles, metal particles, detergent particles, surfactant particles, biocide particles, adsorbent particles, absorbent particles, microcapsules, and combinations thereof.

10. The process of claim 9 wherein the particles are absorbent particles selected from the group consisting of chopped cellulosic sponge particles and chopped polyurethane sponge particles and mixtures thereof.

11. The process of claim 1 wherein at least some of the multicomponent fibers are melt-bonded to at least some of the filaments of the support web.

12. The process of claim 1 further comprising providing a binder coating applied to a major surface of, or applied into the interior of, the porous embedded web.

13. The process of claim 12 wherein the binder coating comprises abrasive particles.

14. The process of claim 1 further comprising introducing filling fibers into the forming chamber, mixing them with the multicomponent fibers, and infilling them into at least some of the interior void spaces of the support web.

15. The process of claim 1 further comprising cutting through the thickness of the support web and the porous embedded web therein so as to separate the porous supported web into a plurality of porous supported articles.

16. The process of claim 1 wherein the elevated temperature exposure comprises passing the support web and the embedded web therein through a through-air bonder.

17. The process of claim 1 wherein the fibers are mixed within the forming chamber by a plurality of rotating spike rollers.

18. The process of claim 1 wherein the filamentary support web exhibits a basis weight of at least about 200 grams per square meter and wherein the porous embedded web exhibits a basis weight of at most about 500 grams per square meter.

* * * * *

UNITED STATES PATENT AND TRADEMARK OFFICE
CERTIFICATE OF CORRECTION

PATENT NO. : 8,828,162 B2  
APPLICATION NO. : 13/503562  
DATED : September 9, 2014  
INVENTOR(S) : Peyras-Carratte et al.

It is certified that error appears in the above-identified patent and that said Letters Patent is hereby corrected as shown below:

On the Title Page

Item (57) (Abstract)
Line 5, Before "fibers" delete "component".

In the Specification

Column 11
Line 39, Delete "Making"," and insert -- Making", 3M docket number 65831US002, --, therefor.

Signed and Sealed this
Twenty-seventh Day of January, 2015

Michelle K. Lee
*Deputy Director of the United States Patent and Trademark Office*